United States Patent [19]

Levinson

[11] Patent Number: 4,887,880
[45] Date of Patent: Dec. 19, 1989

[54] OPTICAL FIBER CONNECTOR STRUCTURE

[75] Inventor: Frank H. Levinson, Menlo Park, Calif.

[73] Assignee: Raynet Corporation, Menlo Park, Calif.

[21] Appl. No.: 239,170

[22] Filed: Aug. 31, 1988

[51] Int. Cl.⁴ .............................................. G02B 6/26
[52] U.S. Cl. .................................. 350/96.15; 350/96.29
[58] Field of Search ............... 350/96.15, 96.16, 96.29, 350/96.30, 96.33, 96.34

[56] References Cited

U.S. PATENT DOCUMENTS

| | | | |
|---|---|---|---|
| 3,317,738 | 5/1967 | Piepenbrink et al. | 250/227 |
| 3,535,018 | 10/1970 | Vasilatos | 350/96.24 |
| 3,615,313 | 10/1971 | Phaneuf | 350/96.25 |
| 3,653,739 | 4/1972 | Strack | 350/96.25 |
| 4,057,719 | 11/1977 | Lewis | 250/227 |
| 4,135,779 | 1/1979 | Hudson | 350/96.15 |
| 4,173,390 | 11/1979 | Kach | 350/96.16 |
| 4,378,143 | 3/1983 | Winzer | 350/96.15 |
| 4,378,951 | 4/1983 | Nagao | 350/96.15 |
| 4,549,782 | 10/1985 | Miller | 350/96.16 |
| 4,575,180 | 3/1986 | Chang | 350/96.15 |
| 4,802,723 | 2/1989 | Miller | 350/96.15 |

FOREIGN PATENT DOCUMENTS 214215A 1/1985 United Kingdom ............ 350/96.15

OTHER PUBLICATIONS

Kahn et al., "A Photonic Backplane for a High Capacity Time Switch", 1987 IEEE, pp. 0587–0591.

Primary Examiner—Frank Gonzalez
Attorney, Agent, or Firm—Dennis E. Kovach; Herbert G. Burkard

[57] ABSTRACT

An optical fiber tap for connecting polymer optical fibers is achieved by heating an end section of the fibers to be connected and deforming the end sections into a non-circular cross-sectional shape so as to form a throughput cross-sectional area and a add/drop throughput area, the optical fiber ends being thereafter aligned so as to allow for efficient signal extraction and injection.

20 Claims, 3 Drawing Sheets

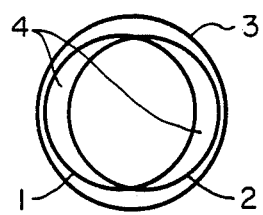
FIG_1
(PRIOR ART)
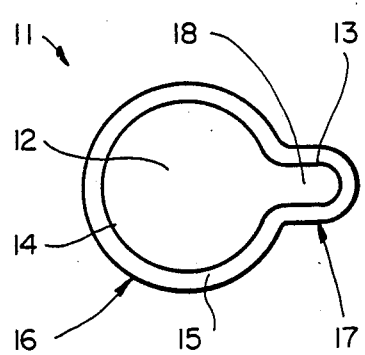
FIG_2
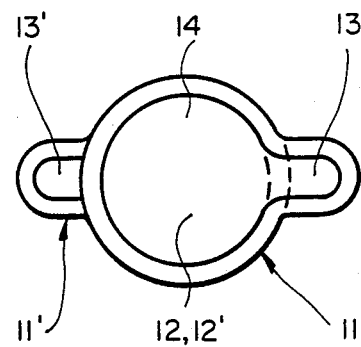
FIG_3
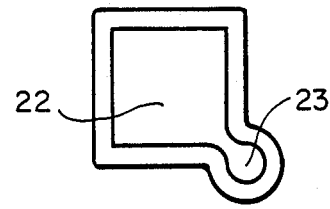
FIG_4

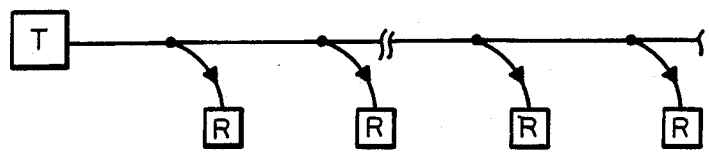
FIG_5
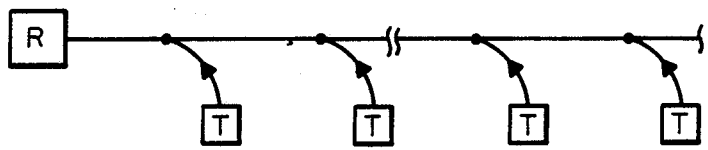
FIG_6
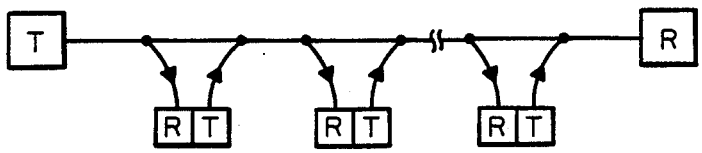
FIG_7
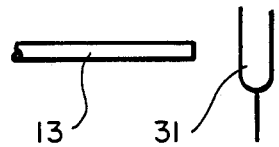
FIG_8

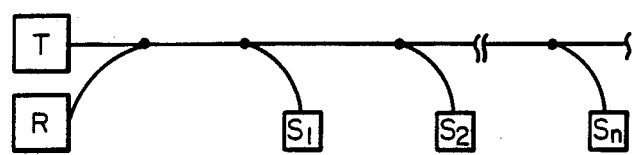
FIG_9
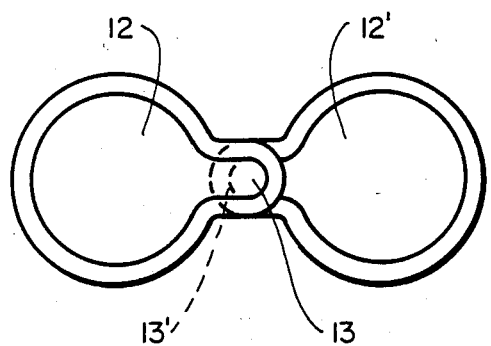
FIG_10
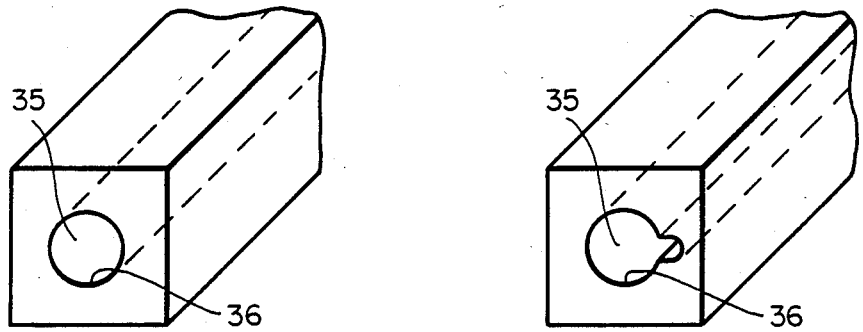
FIG_11a    FIG_11b

4,887,880

OPTICAL FIBER CONNECTOR STRUCTURE

CROSS REFERENCE TO RELATED APPLICATIONS

The present application is related to U.S. patent application Ser. No. 07/238,168, filed concurrently herewith, the disclosure of which is incorporated herein by reference.

BACKGROUND OF THE INVENTION

The present invention relates to noncircular optical fiber structures usable for making optical fiber connections and methods of making same.

Optical fibers are broadly classified into two types, the first being single mode and the second being multimode. Whereas single mode fiber only supports a single mode, referred to as a fundamental mode, multimode fiber supports a plurality of modes, generally of the order of 1,000–10,000 or more. Multimode fiber can be either graded or step index, and can include a core and cladding which are made of glass, polymers, or a combination thereof. Though extensive research has gone into devising connectors for connectorizing optical fibers, the proposed solutions are often craft sensitive to implement or result in unacceptably lossy connections.

SUMMARY OF THE INVENTION

It is an object of the invention to eliminate the above-noted drawbacks and to provide optical fiber taps which are superior to those previously proposed. These and other objects of the invention are achieved by an apparatus for tapping an optical fiber, comprising:

an elongated first optical fiber having a noncircular end which has an end cross-section taken along a plane perpendicular to a longitudinal axis of the fiber which includes a throughput area and an add/drop area, a core of the throughput area being integral with a core of the add/drop area, the add/drop area and throughput area being enveloped by a common cladding;

an elongated second optical fiber having an end which has an end cross-section optically coupled to the first optical fiber end throughput area;

optical path means optically interconnecting the add/drop area and at least one of an electro-optic transducer and a sensor.

The invention further includes methods of forming optical fiber taps. The invention will be further understood by reference to the accompanying detailed description.

BRIEF DESCRIPTION OF THE DRAWINGS

FIG. 1 illustrates a prior art ferrule type optical fiber connector;

FIG. 2 illustrates an optical fiber connector and structure according to the invention;

FIG. 3 illustrates first and second optical fiber ends constructed as shown in FIG. 2 oriented in a connector so as to be out of phase by approximately 180°;

FIG. 4 illustrates an alternate optical fiber end connector structure according to the invention;

FIGS. 5–7 and 9 illustrate network architectures usable according to the invention;

FIG. 8 illustrates a sensor arrangement for use with the invention;

FIG. 10 illustrates a connector arrangement according to the invention for a fail-safe architectural node; and FIGS. 11a and 11b illustrate one preferred method of making optical fiber ends according to the invention.

DESCRIPTION OF PREFERRED EMBODIMENTS

FIG. 1 illustrates in cross-section a typical prior art ferrule type connector which includes a ferrule 3 and first and second optical fibers 1, 2 to be connected. Since an outside diameter of an optical fiber can vary due to manufacturing tolerances, the size of the ferrule 3 necessarily needs to be larger than either one of the optical fibers 1, 2 which allows for fiber misalignment area 4 to contribute significant optical losses. Though these losses can be minimized by more tightly controlling the diameter tolerance of the fibers 1, 2, in many applications this tolerance variation is beyond the control of the end user.

According to a first embodiment of the invention, an optical fiber having a noncircular cross-section which includes a throughput area and an add/drop area is provided as illustrated in FIG. 2. Referring to this figure, optical fiber 11 includes a core 14 and a cladding 15, the core 14 being non-circularly formed so as to form a throughput area 12 and an adjacent add/drop area 13 integrally formed therewith. Specifically, a cross-section of an end of the fiber taken along a plane substantially perpendicular to a longitudinal axis of the fiber which extends along an entire length of the fiber has a noncircular profile and includes a substantially circular region 16 adjacent a nub region 17. A core 14 of the circular region 16 is contiguous with a core 18 of the nub region 17 and is made of one integral material. A cladding 15 is commonly associated with both the core 14 and 18 of the circular and nub regions, respectively. More specifically, the cladding 15 which envelopes both the cores 14 and 18 is a common cladding which does not entirely separate these cores and allows light from one core to mix with light from the other core. Accordingly, a signal in the core 14 after a short distance of the fiber will be consistent and identical with a signal in the core 18 such that any signal tap from either the core 14 or 18 is representative of information within the fiber, and any signal injected into either the core 14 or 18 can be tapped thereafter from any other corresponding location along the fiber where the core 14 and 18 is so shaped. In some applications, it may be advantageous to utilize a fiber having a cross-sectional shape as illustrated in FIG. 2 throughout a length thereof, or more preferably to simply utilize an optical fiber which is substantially circular in cross-section such that the cores 14 and 18 together are circular and surrounded by a circular or cylindrical cladding, with local regions of the fiber being deformed along short lengths thereof, e.g. about 25 mm or so so as to have the shape as illustrated so as to produce a throughput area and tap add/drop area as explained.

FIG. 3 illustrates a preferred embodiment for connectorizing a fiber of the type illustrated in FIG. 2. Referring to this figure, first and second fibers 11, 11' are connected end-to-end such that the add/drop areas 13, 13' are out of phase, a preferred embodiment being 180° out of phase as illustrated such that the throughput areas 12, 12' overlap. In this case, light in one fiber will be coupled to the other fiber via the throughput areas 12, 12'. However, light can be extracted or injected through the add/drop areas 13, 13' as desired. In addition, the amount of attenuation of a connector caused by misalignment of the add/drop areas 13, 13' will be in proportion to a ratio of the area of the add/drop area to the throughput area. For example, in the case of a core having a 1,000 um diameter throughput area 12 and an add/drop area having a diameter of 250 microns, the attenuation caused by misalignment of the add/drop areas would thus be as follows:

$$\frac{250^2}{1000^2 + 250^2} = 0.059$$

In other words, the connector will drop approximately 6% of the available optical power from the add/drop area and the throughput will be approximately 94%. In decibels (dB), this translates to −0.26 dB throughput and −12.3 dB drop by the tap. Moreover, the injection port or add/drop area 13, 13' of this tap structure is not 6% efficient, but rather, if the source is small enough, it can be 100% or nearly so efficient while the throughput loss remains at −0.26 dB. For most fiber optic emitters the power launched in a 250 micron spot is about the same as that launched in a 1,000 micron spot; hence the write tap is highly asymmetrical to the read.

FIG. 4 illustrates a further embodiment of the invention wherein the noncircular optical fiber is predominantly square in cross-section with the add/drop area 23 being formed off of a corner of the fiber for maximum ease of access. Reference numeral 22 denotes the throughput area.

Noncircular optical fiber shapes such as a square shape shown in FIG. 4 are preferred since such fiber shapes cause light asymmetrically injected or removed to be evenly distributed throughout the core after traversing only a short length of the core, i.e. the fiber acts as a mixing rod along this length.

With structures according to the invention, an architecture as illustrated in FIG. 5 is possible whereby a plurality of read taps R can be disposed linearly along the optical fiber so as to result in an efficient read bus connected to a transmitter T. FIG. 6 illustrates an alternate embodiment of the invention whereby a plurality of transmitters can be disposed at each tap for transmitting information so as to form a write bus with write taps.

FIG. 7 illustrates yet a further embodiment of the invention whereby at each tap a receiver and a transmitter are connected, respectively, to the respective add/drop area 13, 13' so as to result in both a read and a write tap at each tap junction which accords a simple and efficient use of a bus and an easier protocol to implement. With this embodiment, each transmitter can regenerate the tapped signal read together with a new signal portion for equipment connected to the tap and hence emulate a ring architecture, or alternatively generate only the new signal portion and hence emulate a bus architecture.

The invention is also advantageous for implementing sensor networks. The biggest problem with optical sensors are the cost of the sensors, the cost of read/write equipment, and the need to be all optical. With the invention, a network of sensors can be formed requiring only one transmit/receiver system pair thus lowering the cost of the read/write equipment so as to be independent of the number of elements being sensed. More specifically, a sensor utilizing a tap of the invention will extract light at the add/drop ratio (e.g. 6% in the example given) but will write back the light at a nearly 100% level. Thus a sensor which works by modulating the amount of reflected light provides a very efficient implementation. Specifically, referring to FIG. 8, if a tuning fork which changes vibration frequency with changing temperature has a mirror on a front surface thereof and is disposed adjacent a drop area 13 of a tap of the invention, the tuning fork would alternatively reflect light down the fiber back through the drop area 13 at essentially a 100% efficiency. Accordingly, the use of such an implementation renders a network as illustrated in FIG. 9 practical whereby only one transmitter/receiver pair is required, and $S_1, S_2 \ldots$ represent multiple sensors disposed in series. The key point is that the entire modulated signal from the sensor can be placed back onto the fiber bus without significant losses, whereas the amount of optical power attenuated by each sensor is minimal (e.g. 6%).

Another preferred embodiment of the invention is the formation of fail-safe nodes. A fail-safe node in a ring or bus removes and overwrites the network bitstream with a regenerated data stream. The error rate is maintained since each node overwrites at at least 3× the power of the passed through signal. On the other hand, if a node dies then the passed through signal is still strong enough to be received by the next downstream node. To make such a tap, the fiber of the embodiment of FIG. 2 can be oriented as illustrated in FIG. 10 such that "nubs" 13, 13' are aligned and accordingly they become the "throughput area" with the enlarged portions 12, 12' of the fibers being misaligned so as to constitute the "add/drop areas". In this case, the throughput loss is large because of the misalignment of the relatively large areas 12, 12'. As is evident, the ability to have a regenerating node fail but not materially effect the network, except for loss of that node, is very valuable. In addition, such a node can be implemented using exactly the same fiber shape as has been previously described. With the arrangment of FIG. 10, the throughput loss can be made as high as desired so as to enable efficient overwriting with minimum to no bit error rates induced, but yet the throughput loss can be maintained low enough such that if the node fails the intensity of light which passes through the throughput areas 13, 13' is sufficiently large such that the next adjacent downstream node can be able to detect the light and hence the information and regenerate same.

Though the invention is implementable using any kind of multimode fiber, either glass or plastic, preferred embodiments of the invention utilize plastic optical fiber. If glass fiber is to be used, it is necessary to shape a glass preform into a shape resembling a final shape desired for the fiber. If plastic optical fiber is to be utilized, again the preform can be preshaped such that upon drawing the fiber from the preform the fiber then has its noncircular throughput cross-section area and an add/drop cross-section area as well.

However, if plastic optical fiber is to be utilized, further preferred embodiments of the invention are possible since the plastic constituting the plastic optical fiber can be deformed using appropriate heat and pressure to reform is cross-section over short lengths. Therefore, one can simply take a standard off-the-shelf plastic optical fiber which is generally circular in cross-section with a very poor tolerance on its outside diameter and reform it with a tool having different mold cavities to form any odd fiber shape as desired over a short length of the fiber which will then constitute a tap or coupling region thereof (e.g. 25 mm in length). In addition to transforming the fiber from a round to a desired new shape in the forming process, the forming process can also be utilized to form a smooth 90° perpendicular surface on the end of the plastic fiber as well as forming the future connector surface. Limitations of the technique are that the circular cross-section cannot be infinitely deformed as the deformation will increase the circumference of the plastic optical fiber thus "thinning" the fiber cladding. Generally the cladding can be thinned by 20-30% without significant optical losses, and a preferred embodiment is to reshape the fiber end such that on average the cladding is thinned by less than 40%, preferably less than 30%, more preferably less than 25%, but optimally more than 5%, or more than 10%. In addition, the mold cavity must be of good smoothness, though in general it does not need to have an optical smoothness texture. Temperature and pressure need to be controlled as well. An additional advantage of the invention is that reforming a plastic optical fiber utilizing a mold as described can remove all tolerance related problems associated with plastic optical fiber connectors. This is accomplished by forming the throughput area or waveguide channel section of the fiber with precise precision and allowing any excess material to make a rather variably sized add/drop area or nub portion 13. The process of reforming the fiber can form all desired taps as described, e.g. both read, write, sensors, and fail-safe node structures. In addition, the process can be used to mass produce numerous fiber connectors of predetermined lengths.

A further preferred embodiment of the invention is to shape plastic optical fiber using shape memory metals or heat shrinkable polymers. Specifically, referring to FIG. 11, FIG. 11a illustrates an optical fiber 35 disposed within a mode cavity 36 made of an appropriate material which is recoverable, preferably at or above a glass transition temperature $T_g$ of the plastic optical fiber 35. Upon heating the cavity to the temperature $T_g$, the cavity 36 changes shape and recovers to its recoverable shape as illustrated in FIG. 11b, and accordingly reforms the fiber 35 so as to have the new shape as well since the temperature $T_g$ corresponds or is larger than the softening temperature of the fiber.

According to the invention, any number of a variety of non-circular fiber shapes are preferred, a major limitation being that the aspect ratio of the final shape not be too significantly different from the aspect ratio of the original shape so as to minimize an amount of thinning of the cladding which results. An original circular geometry has several advantages since it results in the smallest circumferential change and achieves maximum symmetry for simpler tooling, machining or molding tools. In addition, cladding induced inefficiencies are minimized.

Having thus described presently preferred embodiments of the present invention, it will now be appreciated by those skilled in the art that many changes in construction and widely differing embodiments and applications of the invention will suggest themselves without departure from the spirit and scope of the invention. Any disclosures and descriptions herein are intended to be illustrative and are not in any sense limiting of the invention, more preferably defined in scope by the following claims.

What is claimed is:

1. An apparatus for tapping an optical fiber, comprising:
    an elongated first optical fiber having a noncircular end which has an end cross-section taken along a plane perpendicular to a longitudinal axis of the fiber which includes a throughput area and a light-add/light-drop area, a core of the throughput area being integral with a core of the light-add/light-drop area, the light-add/light-drop area and throughput area being enveloped by a common cladding;
    an elongated second optical fiber having an end which has an end cross-section optically coupled to the first optical fiber end throughput area;
    optical path means optically interconnecting the light-add/light-drop area and at least one of an electro-optic transducer and a sensor.

2. The apparatus of claim 1, the first optical fiber comprising a multimode optical fiber.

3. The apparatus of claim 1, the optical path means including a waveguide optically interconnecting the light-add/light-drop area and the at least one of the transducer and sensor.

4. The apparatus of claim 1, the second optical fiber end being non-circular, the end cross-section of the second optical fiber including a throughput area and an light-add/light-drop area, the throughput area of the first and second fibers being optically interconnected while the light-add/light-drop areas are maintained out of phase.

5. The apparatus of claim 4, further comprising at least one of a second electro-optic transducer and a second sensor optically coupled to the second fiber light-add/light-drop area.

6. The apparatus of claim 1, the first and second fiber ends each including a polymer core surrounded by a polymer cladding.

7. The apparatus of claim 1, the first and second optical fiber throughput areas being shaped, sized and arranged so as to induce an attenuation to an optical signal propagating therebetween which is less than 1.0 dB.

8. The apparatus of claim 1, the first and second optical fiber throughput areas being shaped, sized and arranged so as to induce an attenuation to an optical signal propagating therebetween which is between 5 and 12 dB.

9. The apparatus of claim 1, the first optical fiber end being part of a first optical fiber and the second optical fiber end being part of a second optical fiber, the first and second optical fibers having substantially uniform noncircular cross-sections throughout their length.

10. The apparatus of claim 1, the first optical fiber end being part of a first optical fiber and the second optical fiber end being part of a second optical fiber, the first and second optical fibers having substantially uniform circular cross-sections in sections adjacent the first and second fiber ends.

11. The apparatus of claim 1, the optical path means optically interconnecting the light-add/light-drop area at a sensor, the sensor being arranged so as to modulate light withdrawn from the light-add/light-drop area and then reinjecting the modulated light into the light-add/light-drop area.

12. A method of tapping an optical fiber comprising the steps of:
    deforming an end section of a first preformed optical fiber from a first cross-sectional profile to a connectable second cross-sectional profile, the second profile being non-circular and including a throughput area and an light-add/light/drop area;

optically connecting the throughput area to a second optical fiber end;

optically connecting at least one of an electro-optic transducer and a sensor to the light-add/light-drop area.

13. The method of claim 12, the first optical fiber end section including a polymer core and a polymer cladding.

14. The method of claim 13, the first optical fiber end section being deformed by being heated to a softening temperature thereof and by applying pressure to the first optical fiber end section while in its softened state.

15. The method of claim 14, the first optical fiber having a substantially circular profile at a section thereof adjacent its deformed end, the end section being substantially circular prior to being deformed.

16. The method of claim 14, the second optical fiber including a polymer core and a polymer cladding, the second optical fiber end being deformed by being heated to a softening temperature thereof and by applying pressure to the second optical fiber section while in its softened state.

17. The method of claim 12, the end section of the optical fiber being deformed such that a dimensional tolerance of the throughput area is controlled so as to be within a predefined narrow range, the light-add/light-drop area having an uncontrolled variable size which is dependent on an amount of deviation of an undeformed cross-sectional size of the first optical fiber end section from a desired size.

18. A method of deforming an end section of a first preferred optical fiber from a first cross-sectional profile to a connectable second cross-sectional profile, comprising the steps of:

disposing the end section within a cavity having a cross-sectional profile similar to the first cross-sectional profile, the cavity being surrounded by an unstable memory material and being formed thereby;

heating the memory material to a temperature sufficient to cause it to dimensionally deform to a cross-sectional profile similar to the second profile.

19. The method of claim 18, the memory material comprising a metal.

20. The method of claim 18, the second profile being non-circular and including a throughput area and an light-add/light-drop area.

* * * * *